(12) United States Patent
Purdy et al.

(10) Patent No.: US 11,725,135 B2
(45) Date of Patent: Aug. 15, 2023

(54) MUD ACID COMPOSITION AND METHODS OF USING SUCH

(71) Applicant: FLUID ENERGY GROUP LTD., Calgary (CA)

(72) Inventors: Clay Purdy, Medicine Hat (CA); Markus Weissenberger, Calgary (CA); Karl W. Dawson, Calgary (CA); Kyle G. Wynnyk, Calgary (CA)

(73) Assignee: Dorf Ketal Chemicals FZE, Fujairah (AE)

( * ) Notice: Subject to any disclaimer, the term of this patent is extended or adjusted under 35 U.S.C. 154(b) by 0 days.

(21) Appl. No.: 17/539,357

(22) Filed: Dec. 1, 2021

(65) Prior Publication Data

US 2022/0089938 A1 Mar. 24, 2022

Related U.S. Application Data

(62) Division of application No. 16/839,490, filed on Apr. 3, 2020, now Pat. No. 11,370,961.

(30) Foreign Application Priority Data

Apr. 5, 2019 (CA) .................... CA 3039235

(51) Int. Cl.
*C09K 8/74* (2006.01)
*C09K 8/528* (2006.01)

(52) U.S. Cl.
CPC ............... *C09K 8/74* (2013.01); *C09K 8/528* (2013.01); *C09K 2208/32* (2013.01)

(58) Field of Classification Search
CPC ...... C09K 8/74; C09K 8/528; C09K 2208/32; C23G 1/086; C23G 1/125; C23F 11/08
See application file for complete search history.

(56) References Cited

U.S. PATENT DOCUMENTS

| | | | |
|---|---|---|---|
| 6,506,711 B1 | 1/2003 | Shuchart et al. | |
| 8,389,453 B2 | 3/2013 | Thomson | |
| 10,035,949 B2 | 7/2018 | Gill et al. | |
| 2007/0099806 A1* | 5/2007 | Stewart | H01L 21/28518 257/E21.165 |
| 2011/0275164 A1* | 11/2011 | Visintin | H01L 21/02079 252/79.3 |

FOREIGN PATENT DOCUMENTS

WO 2016033259 A1 3/2016

* cited by examiner

*Primary Examiner* — Kumar R Bhushan
(74) *Attorney, Agent, or Firm* — Blank Rome LLP

(57) ABSTRACT

An inhibited mud acid composition, said composition comprising: hydrofluoric acid in solution; an alkanolamine; and a mineral acid selected from a group consisting of: HCl; MEA-HCl and other modified acids, wherein said alkanolamine and hydrofluoric acid are present in a molar ratio of at least 1:1.

18 Claims, 6 Drawing Sheets

MUD ACID COMPOSITION AND METHODS OF USING SUCH

CROSS REFERENCE TO RELATED APPLICATIONS

This application is a divisional of U.S. Non-Provisional application Ser. No. 16/839,490, filed Apr. 3, 2020, which claims the benefit of Canadian Patent Application No. 3,039,235, filed Apr. 5, 2019, the entire contents of which are incorporated herein by reference.

FIELD OF THE INVENTION

The present invention is directed to a novel mud acid composition for use in oil and gas industry. Specifically, it is directed to an inhibited mud acid and methods of using such.

BACKGROUND OF THE INVENTION

Acids have numerous applications across most industries. The use of acids requires certain safety precautions. All acids are not created equal, some are mundane and are found in almost every household, e.g., vinegar. Other acids are highly controlled to avoid major releases, which can cause serious environmental and human exposure consequences.

Hydrofluoric acid, while not a strong acid, i.e., does not dissociate fully in water, is classified as one of the most dangerous substances used in industry. Even small amounts of dermal exposure can result in organ failure and death.

Hydrofluoric acid is a solution of hydrogen fluoride (HF) and water. It is used in the preparation of almost all fluorine compounds, such as polymers. It is a highly corrosive colourless solution that is capable of dissolving a large number of materials, such as glass (silica) and various metals. Because it is highly reactive to glass and corrosive to various metals, it must be stored in plastic containment vessels or other non-reactive materials. As a gas (fumes), hydrogen fluoride is poisonous and can quickly and irreversibly damage soft tissues such as lungs and the corneas of the eyes. Aqueous hydrofluoric acid is a contact-poison with the potential for deep burns that, although initially painless, result in tissue death. By interfering with the body's calcium metabolism, the concentrated acid may also cause systemic toxicity and eventual cardiac arrest and fatality.

U.S. Pat. No. 8,389,453 teaches a tetrafluoroboric acid and an organic nitrogenous base, related compounds and compositions, can be used in conjunction with various methods of cleaning and/or the treatment of substrate surfaces. It specifically discloses a method for removing surface contaminants, said method comprising: providing an aqueous composition comprising a compound, said compound the acid-base reaction product of tetrafluoroboric acid and urea, said urea and said tetrafluoroboric acid in a molar ratio of about 1.0 to about 3.0, said urea utilized as a base and dissolved in said composition; and contacting said composition and a surface comprising at least one contaminant thereon.

Patent application WO2016033259A1 teaches methods for removing and inhibiting deposits, reducing the pH of aqueous mixtures, and increasing the recovery of crude oil from subterranean formations, the methods comprising contacting an acid composition with a liquid that is in contact with a metal surface or with a well or formation. The composition comprises a salt of a nitrogen base having a fluoro-inorganic anion. In particular, these methods are intended for removing deposits and lowering the pH. These methods can be used in steam generators, evaporators, heat exchangers, and the like that use water compositions containing produced water and other water sources in plant unit operations.

U.S. Pat. No. 10,035,949 B2 teaches methods for increasing the recovery of crude oil from a subterranean hydrocarbon-containing formation and for removing or inhibiting deposits in a well, the methods comprising contacting an acid composition that comprises a salt of a nitrogen base having a fluoro-inorganic anion with the well or the formation.

Also known is tetrafluoroboric acid with the chemical formula $H_3OBF_4$. It is mainly produced as a precursor to fluoroborate salts. It is a strong acid and quite corrosive as it attacks the skin. It is available commercially as a solution in water and other solvents such as diethyl ether. It is considered to be a retarded acid which permits deep penetration into the reservoir before the acid is spent, i.e., fully reacted. For a solution of tetrafluoroboric acid, at no point in time is there a high amount of free HF; making it less reactive than common mud acids. The extended reaction times of tetrafluoboric acid treatments require longer shut-in times compared to common mud acid treatments.

In light of the prior art, there remains a need to produce a more HS&E orientated, technically advanced mud acid system and method of using such. The prior arts value is undeniable in industry but the health and environment risks and technically negative aspects associated with its use are many and considerable.

SUMMARY OF THE INVENTION

According to a first aspect of the present invention, there is provided a mud acid composition comprising:
  an inhibited hydrofluoric acid aqueous composition, said composition comprising:
    hydrofluoric acid in solution; and
    an alkanolamine; and
    an acid having a pKa value of less than 3;
wherein said alkanolamine and hydrofluoric acid are present in a molar ratio of at least 1:1.

Preferably, the acid with a pKa of less than 3 is selected from the group consisting of: HCl, MEA-HCl, urea-HCl, methanesulfonic acid, sulfuric acid, sulfamic acid, and lysine-HCl. Urea-HCl may come in various ratios of urea to HCl preferably, Molar ratios below 1:1 are desirable. Ratios of 0.8:1 and less urea:HCl are more desirable, ratios of 0.7:1 and less are even more desirable. MEA-HCl may come in various ratios of MEA to HCl preferably, ratios ranging from 1:3 to 1:15 are desirable. Ratios ranging from 1:4 to 1:10 are more desirable. Ratios ranging from 1:5 to 1:9 are even more desirable.

Preferably, said alkanolamine and hydrofluoric acid are present in a molar ratio of at least 1:1. More preferably, said alkanolamine and hydrofluoric acid are present in a molar ratio of at least 1.1:1. Preferably also, the alkanolamine is selected from the group consisting of: monoethanolamine, diethanolamine, triethanolamine, and combinations thereof. More preferably, the alkanolamine is monoethanolamine. According to another preferred embodiment, the alkanolamine is diethanolamine. According to yet another preferred embodiment, the alkanolamine is triethanolamine.

According to a second aspect of the present invention, there is provided a use of an acid composition according to the present invention in the oil and gas industry to perform an activity selected from the group consisting of: stimulating formations; assisting in reducing breakdown pressures during downhole pumping operations; treating wellbore filter cake post drilling operations; treating scale on cyclical steam or SAGD wells and midstream cleaning applications; assisting in freeing stuck drill pipe; descaling pipelines and/or production wells; increasing injectivity of injection wells; fracturing wells; performing matrix stimulations; conducting annular and bullhead squeezes & soaks; pipe and/or coiled tubing scale washes; increasing effective permeability of formations; reducing or removing wellbore damage; cleaning perforations; and stimulation of sandstone formations According to yet another aspect of the present invention, there is provided a method of using a mud acid to acidize or stimulate a sandstone formation, said method comprises the steps of:
- providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1.1:1;
- providing an acid composition, said acid composition having a low pH and adapted to activate the inhibited hydrofluoric acid composition when put in contact therewith;
- combining the inhibited hydrofluoric acid composition with said acid composition to create a mud acid;
- applying said mud acid to a silicate-containing formation and allowing said mud acid composition sufficient exposure time to dissolve a pre-determined amount of silica.

According to yet another aspect of the present invention, there is provided a method for removing silica or silicate deposits, said method comprising the steps of:
- providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1.1:1;
- providing an acid composition, said acid composition having a low pH and adapted to activate the inhibited hydrofluoric acid composition when put in contact therewith;
- combining the inhibited hydrofluoric acid composition with said acid composition to create a mud acid.

Preferably, the method comprises the steps of:
- providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1.1:1;
- providing an acid composition, said acid composition comprising a corrosion inhibitor package and having a low pH and adapted to activate the inhibited hydrofluoric acid composition when put in contact therewith;
- combining the inhibited hydrofluoric acid composition with said acid composition to create a mud acid.

Preferably, the corrosion inhibitor comprises:
a metal iodide such as potassium iodide;
a terpene;
optionally, a cinnamaldehyde or a derivative thereof;
at least one amphoteric surfactant;
a solvent; and
optionally, a non-emulsifier.

Preferably, the acid composition is selected from the group consisting of acids having a pKa value of less than 3. Preferably, the acid having a pKa value of less than 3 is selected from the group consisting of: hydrochloric acid, nitric acid, sulfuric acid, modified acids, and organic acids. Preferably, the modified acid is selected from the group consisting of: HCl, MEA-HCl, urea-HCl, methanesulfonic acid; sulfuric acid; sulfamic acid; and lysine-HCl. Urea-HCl may come in various ratios of urea to HCl preferably, molar ratios below 1:1 are desirable. Ratios of 0.8:1 and less urea:HCl are more desirable, ratios of 0.7:1 and less are even more desirable. MEA-HCl may come in various ratios of MEA to HCl preferably, ratios ranging from 1:3 to 1:15 are desirable. Ratios ranging from 1:4 to 1:10 are more desirable. Ratios ranging from 1:5 to 1:9 are even more desirable. Lysine-HCl may come in various ratios of lysine to HCl preferably, ratios ranging from 1:3 to 1:15 are desirable. Ratios ranging from 1:4 to 1:10 are more desirable. Ratios ranging from 1:5.5 to 1:9 are even more desirable.

BRIEF DESCRIPTION OF THE FIGURES

The invention may be more completely understood in consideration of the following description of various embodiments of the invention in connection with the accompanying figures, in which.

DESCRIPTION OF EMBODIMENTS OF THE PRESENT INVENTION

Example 1—Inhibited HF Composition

According to a preferred embodiment of the present invention, the mud acid is first made by preparing an inhibited HF. The inhibited HF can be made by the addition of at least 1 molar equivalent of an alkanolamine, such as monoethanolamine (MEA). Preferably, a safety factor of 10% is used, so 1.1 molar equivalents of MEA are added to 1 mole of HF. The subsequent addition of an acid to the inhibited HF composition restores the inhibited HF's ability to dissolve sand, and it has a similar dissolving power to a regular mud acid. Laboratory testing has shown that the inhibited HF does not prevent the formation of reprecipitation products, and performs on par with a standard mud acid mixture.

Preferably, the inhibited HF is understood to eliminate the fatal skin contact hazard, however, 5.7% of the MEA remains unreacted, resulting in a solution that is pH 11.5 to 12, and may still carry some skin irritation issues.

Preferably, an inhibited acid should be effective at dissolving metal oxides (especially aluminum oxide) as well as complex silicates. Other desirable properties include: the ability to rapidly solubilize iron oxides and ability to dissolve calcium based scales.

Inhibition of HF

Figure 1:
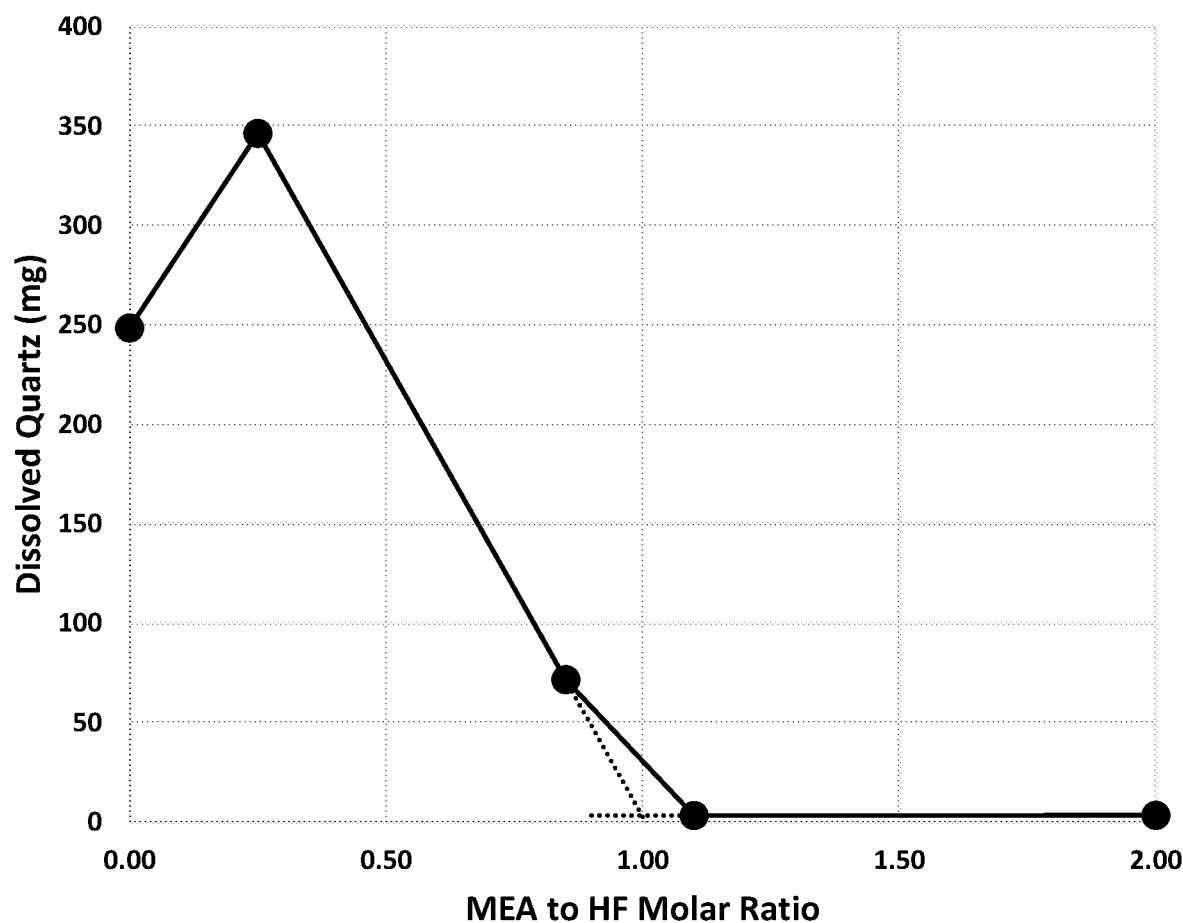
FIG. 1 is a graph depicting the dissolved Quartz after 4 Hours of Reaction Time at 75° C. for Various MEA/HF Ratios.
Figure 2:
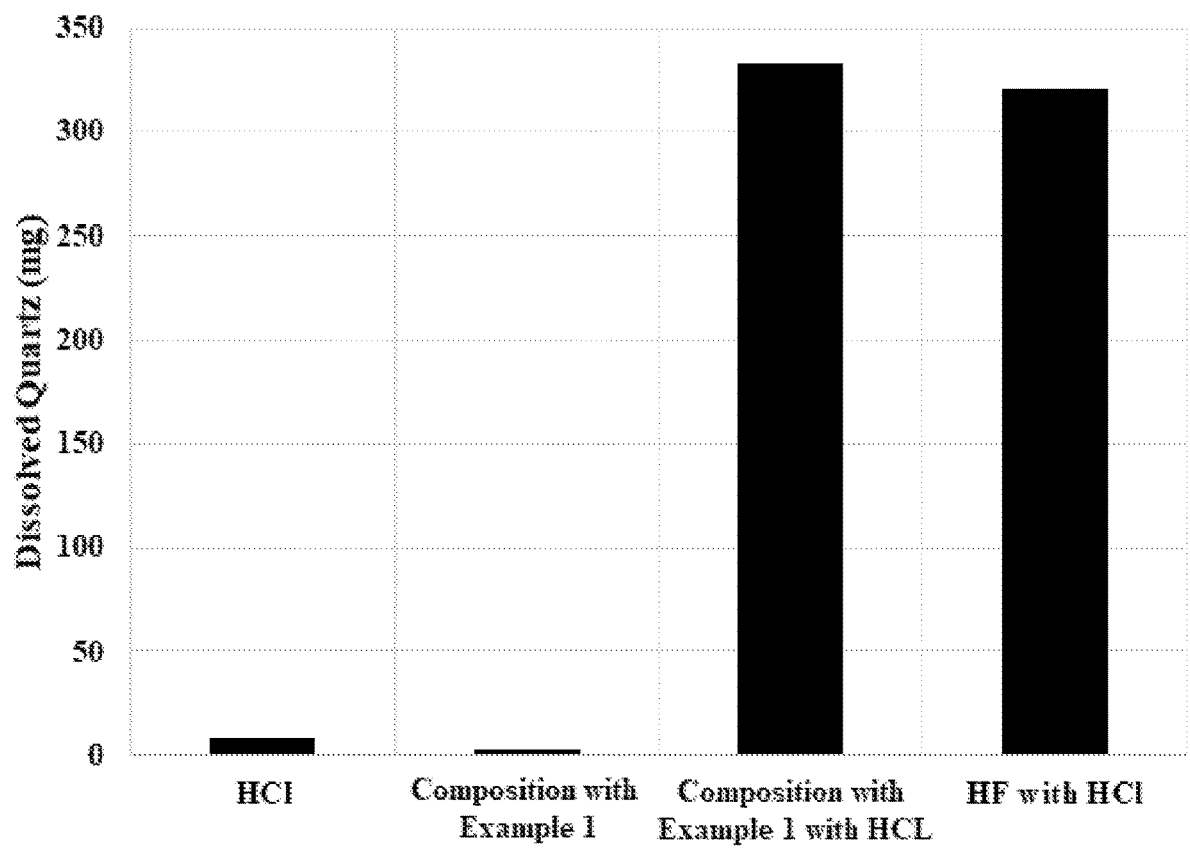
FIG. 2 is a graph showing the comparison of the Quartz Dissolving Ability of Various Acid Solutions 4 Hours Reaction Time at 75° C.
Figure 3:
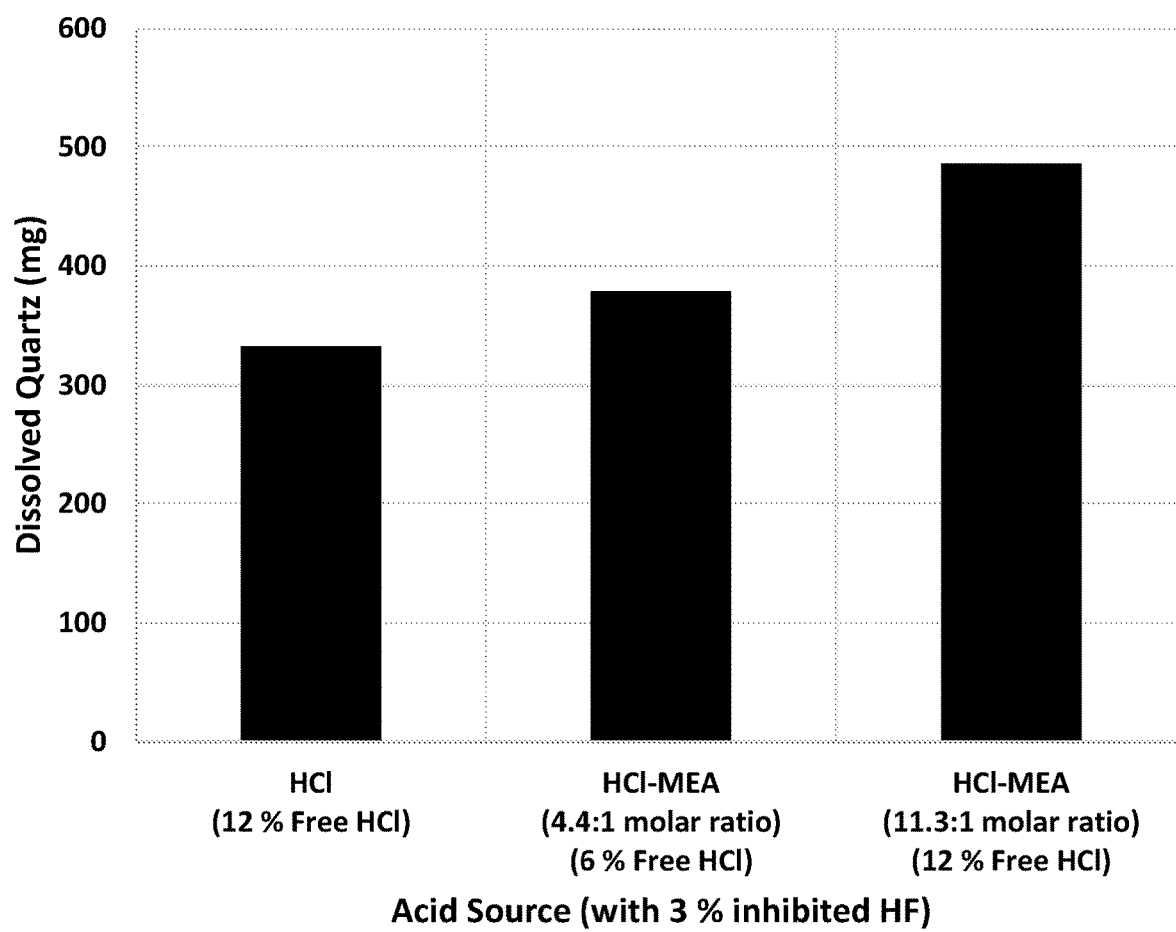
FIG. 3 is a graph showing the comparison of the Quartz Dissolving Ability of 3% HF Mud Acids with Various HCl Sources 4 Hours Reaction Time at 75° C.

The inhibited HF solution can regain its quartz dissolving potential through the addition of an acidic solution, such as HCl or Modified Acid such as MEA-HCl (in a molar ratio of 1:4.1), as shown in FIG. 2. By themselves, HCl or inhibited HF dissolve essentially no quartz; however, in combination they perform on par with a conventional mud acid (HF:HCl). When a modified acid such as MEA-HCl (in a molar ratio of 1:4.1) is utilized as an activator, both systems on their own bring a new level of safety and greatly reduce the current dangers of transporting and handling HF and HCl or HCl/ABF (ammonium bifluoride). When mixed "in-situ" the yielded mud acid creates a highly effective replacement to the incumbent.

To evaluate the performance of mud acids according to preferred embodiment of the present invention created with acid compositions comprising HCl:MEA in ratios of 4.4:1, 6.3:1, and 11.3:1, inhibited HF mud acids were prepared using HCl and acid compositions comprising HCl:MEA in ratios of 4.4:1; and 11.3:1 with various amount of free HCl (6 to 12%). The results show that mud acids produced with acid compositions comprising HCl:MEA in molar ratios of 4.4:1; and 11.3:1 match, and may even exceed, the performance of a conventional HCl mud acid.

Effects of Mud Acid Compositions Comprising HCl:MEA in Ratios of 4.4:1, 6.3:1, and 11.3:1 on Reprecipitation Three types of reprecipitation products are commonly known to occur during sandstone acidizing, and are referred to as primary, secondary, and tertiary reaction products.

Primary precipitation products can occur between HF and calcium (from $CaCO_3$) to produce calcium fluoride as per equation (1):

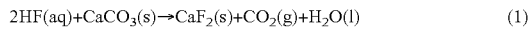
$$2HF(aq)+CaCO_3(s) \rightarrow CaF_2(s)+CO_2(g)+H_2O(l) \quad (1)$$

The precipitation will occur when the concentration of $CaF_2$ exceeds 0.16 g/L. This reaction is avoided by using an acidic pre-flush to clean the near-wellbore region, and the inhibited HF combined with HCl for example, will not prevent this reaction if calcium is present.

Secondary precipitation products are those that occur as a result of a reaction with hexafluorosilicic acid ($H_2SiF_6$), which is produced when HF reacts with quartz as shown in equation 2, or with clay (general formula of Al—Si) as shown in equation 4:

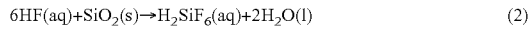
$$6HF(aq)+SiO_2(s) \rightarrow H_2SiF_6(aq)+2H_2O(l) \quad (2)$$

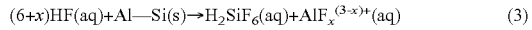
$$(6+x)HF(aq)+Al—Si(s) \rightarrow H_2SiF_6(aq)+AlF_x^{(3-x)+}(aq) \quad (3)$$

Hexafluorosilicic acid can react with alkali metals ($M^+$), typically sodium or potassium, to produce hexafluorosilicate precipitates as per equation 4:

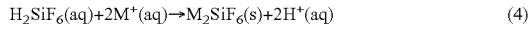
$$H_2SiF_6(aq)+2M^+(aq) \rightarrow M_2SiF_6(s)+2H^+(aq) \quad (4)$$

Figure 4:
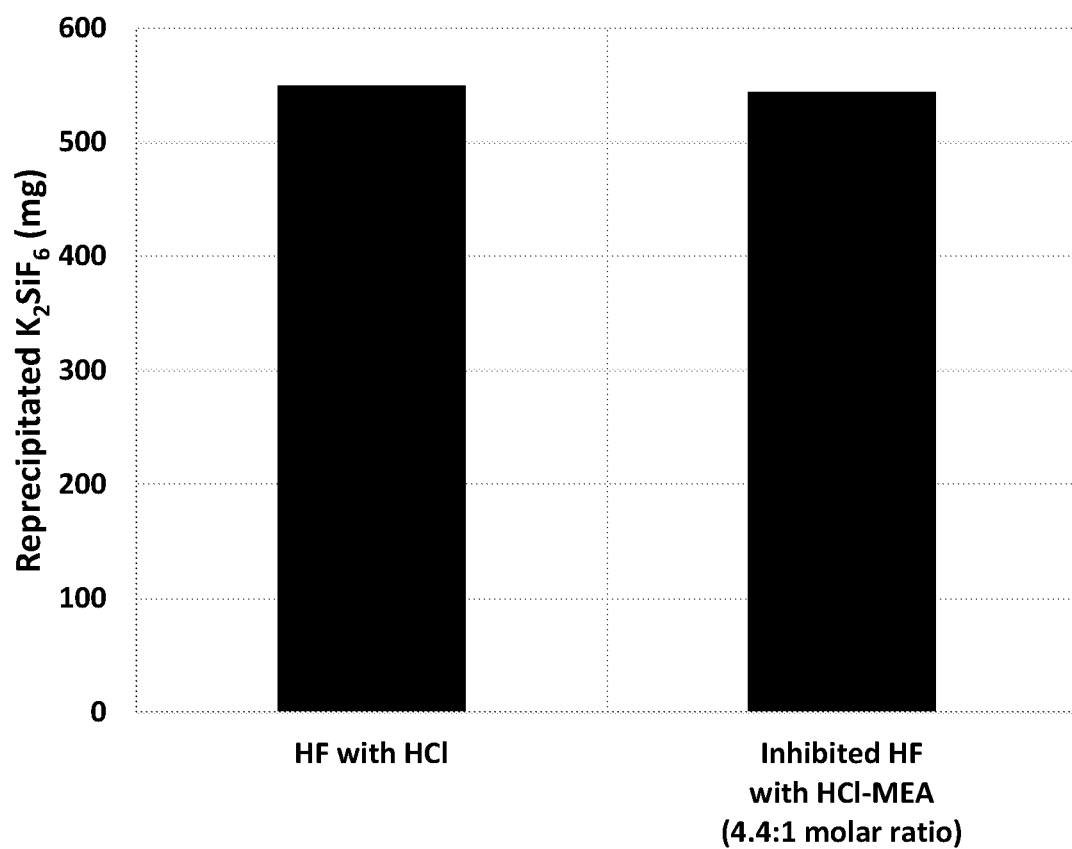
FIG. 4 is a graph showing reprecipitation of $K_2SiF_6$ in laboratory trials.

The precipitation will occur when the concentration exceeds 6.4 g/L for $Na_2SiF_6$, and 1.8 g/L for $K_2SiF_6$. The inhibited mud acid according to a preferred embodiment of the present invention was not expected to prevent this precipitation, and laboratory trials demonstrate that similar amounts of potassium hexafluorosilicate were precipitated in comparison to a standard mud acid (FIG. 4).

Hexafluorosilicic acid can also react with the aluminum in clays to produce a silica gel precipitate as shown in equation 5 (unbalanced):

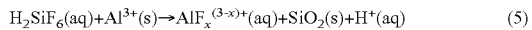
$$H_2SiF_6(aq)+Al^{3+}(s) \rightarrow AlF_x^{(3-x)+}(aq)+SiO_2(s)+H^+(aq) \quad (5)$$

This reaction is reported to occur slowly at temperatures below 50° C., but rapidly at higher temperatures. When dissolving Kaolinite clay ($Al_2Si_2O_5[OH]_4$), laboratory tests found a linear amount of dissolved material when comparing a standard mud acid to an inhibited mud acid made with an acid composition comprising HCl:MEA in a ratio of 11.3:1 (FIG. 5), demonstrating that this invention is as effective as current systems while providing many storage, environmental and handling advantages.

The aluminum fluoride produced in equation 5 (also equation 3) can also precipitate above pH 2.5 to 3 if there is a high F/Al ratio, but the solubility of $AlF_3$ is relatively high at 56 g/L. Attempts to measure this in the lab were unsuccessful due to the precipitation of $Na_2SiF_6$ when adjusting the spent solution pH with NaOH.

Tertiary precipitation products are those that occur as a result of a reaction of the aluminum fluorides produced in equations 3 and 5 continuing to react with clays to produce a silica gel precipitate as shown in equation 6 (unbalanced):

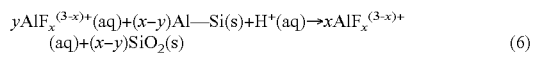
$$yAlF_x^{(3-x)+}(aq)+(x-y)Al—Si(s)+H^+(aq) \rightarrow xAlF_x^{(3-x)+}(aq)+(x-y)SiO_2(s) \quad (6)$$

Figure 5:
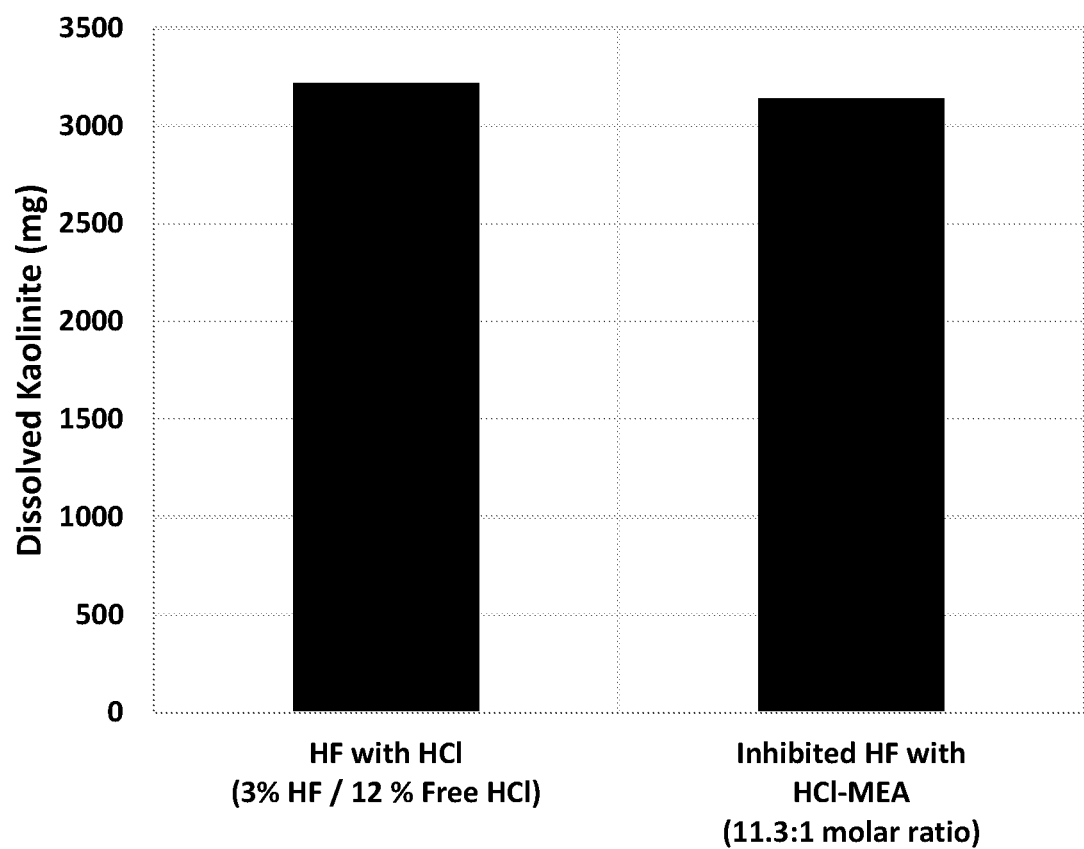
FIG. 5 is a graph showing the kaolinite Dissolving Ability of Standard Mud Acid versus Inhibited Mud Acid.

This tertiary reaction only occurs slowly at temperatures below 95° C., and is understood to produce essentially the same precipitates as the secondary reaction products in equation 5. Similar results to those obtained in FIG. 5 are expected, providing a linear performance between a standard mud acid and a mud acid according to a preferred embodiment of the present invention.

Figure 6:
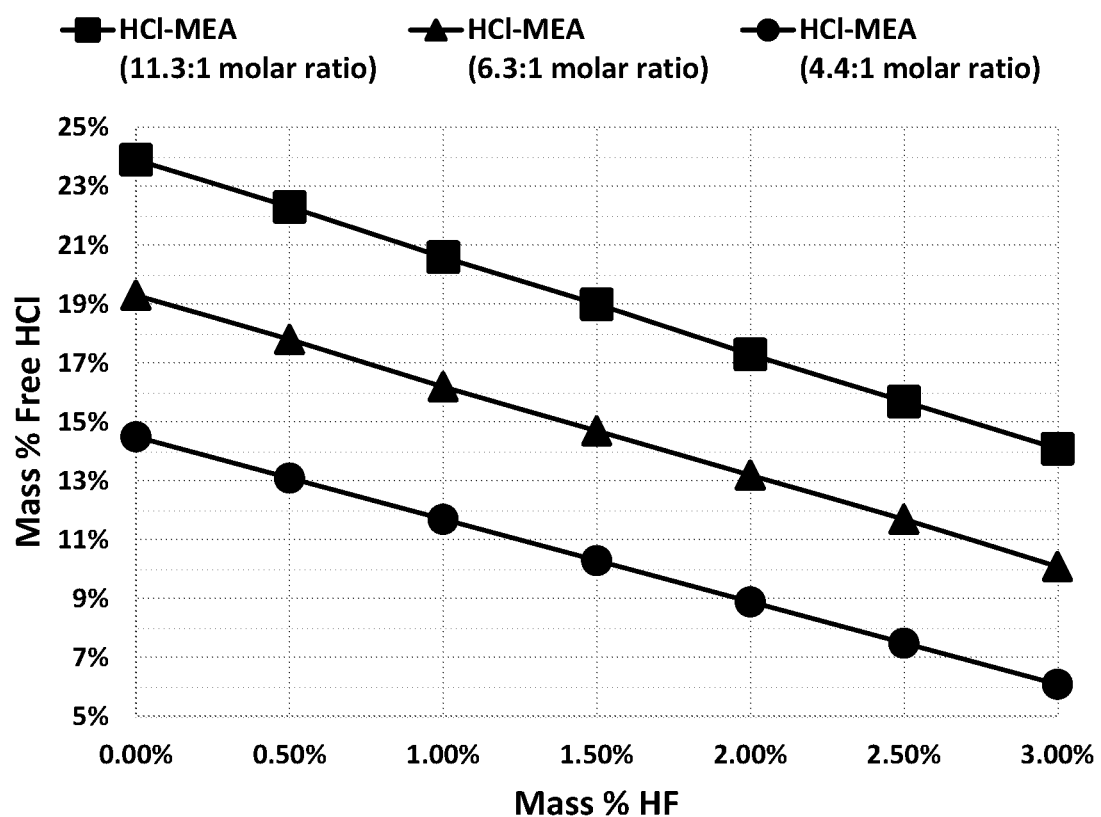
FIG. 6 is a graph showing the Maximum Possible % Free HCl in Mud Acids Made with Inhibited HF and a modified acid comprising monoethanolamine and HCl.

Mud Acid Ratio Limitations Using Acid Composition of HCl:MEA in Ratios of 4.4:1, 6.3:1, and 11.3:1 and Inhibited HF Mud acids typically contain HF at concentrations of 0.5 to 3% by mass, and HCl at 4 to 15% by mass. By using acids with an enhanced HSE profile, such as HCl:MEA (in a ratio of 4.4:1), rather than 15% HCl, the additional MEA inhibitor will limit the amount of free HCl available in solution. FIG. 6 shows the maximum amount of free HCl that would be available for mud acids made using inhibited HF and acid compositions comprising HCl:MEA in ratios of 4.4:1; 6.3:1; and 11.3:1.

According to another embodiment of the present invention, a few common high HCl:HF ratios, such as 12:3 and 10:2, are not possible using HCl:MEA (in a ratio of 4.4:1) and inhibited HF. To achieve these higher strength mud acids, HCl:MEA blends with lower HSE performance (where the HCl:MEA ratios are 6.3:1; and 11.3:1, for example) may be required.

According to a preferred embodiment of the present invention, the composition can be used in oil refining (as an acid catalyst in a standard oil refinery process). According to another preferred embodiment of the present invention, the composition can be used in the production of organofluorine compounds including: Teflon®, fluorocarbons, fluoropolymers and refrigerants like freon. According to yet another preferred embodiment of the present invention, the composition can be used in the production of fluoride compounds, such as cryolite and aluminium trifluoride, to name a few examples. According to another preferred embodiment of the present invention, the composition can be used as a pickling and cleaning agent in metalworking. It has a great ability to remove oxides and other impurities from carbon steels and stainless steel. According to yet another preferred embodiment of the present invention, the composition can be used, upon dilution, as a household or industrial rust stain remover or aluminum or other metal brightener Dermal Toxicity HF is an acute dermal toxin, with an LD50 of between 401 and 802 mg/kg in rats. To determine the dermal toxicity of the composition of Example 1, a sample was sent to an independent 3rd party lab (STILLMEADOW, Inc.). The study found that the acute dermal toxicity LD50 for the composition of inhibited HF as made according to Example 1 on albino rats was greater than 5,050 mg/kg (Study ID 22094-18), which is well above the 2,000 mg/kg limit for a material to be considered a potential acute dermal toxin.

Corrosion Inhibitor Performance

The effectiveness of a proprietary corrosion inhibitor package in the mud acid composition comprising the inhibited HF made in accordance with Example 1 and blended with an acid made up of HCl-MEA in a molar ratio of 6.3:1 was evaluated. The HCl-MEA acid contained the corrosion inhibitor package prior to mixing with the inhibited HF. The target mixture was 16.1 percent by mass of the inhibited HF acid composition made in accordance with Example 1 and 83.9 percent by mass of MEA-HCl (in a 1:6.3 molar ratio) which is equivalent to 3% free HF and 9.8% free HCl.

The MEA-HCl (in a 1:6.3 molar ratio) contained a loading of 1% CI-5CNE (equivalent to 1% CI-5, 0.75% CI-1A, and 0.1% NE-1), and to replicate the anticipated field procedure, no additional CI was added. CI-1A refers to potassium iodide; CI-5 refers to a proprietary corrosion inhibitor package comprising a terpene; at least one amphoteric surfactant; and a solvent. NE-1 refers to a common commercially available non-emulsifier.

The mud acid was tested at 90° C. for 6 hours on coupons of several common oil field steels: 1018 carbon steel, J55, L80, and P110. The results are shown in Table 1.

TABLE 1

Corrosion Rates for the composition made in accordance
with Example 1 activated with 1:6.3 MEA-HCl
(9.8:3 Mud Acid Equivalent) at 90° C. for 6 Hours

| Metal | Corrosion Rate | |
|---|---|---|
| | mm/year | lb/ft² |
| 1018 | 13.426 | 0.015 |
| J55 | 16.036 | 0.018 |
| L80 | 13.274 | 0.015 |
| P110 | 12.764 | 0.014 |

The results show that favorable corrosion rates were obtained that are far below industry acceptable rates, with results between 0.014 and 0.018 lb/ft². The composition made in accordance with Example 1 corrosion results are slightly higher than corrosion rates that would typically be obtained with HCl:MEA (in a ratio of 4.4:1) of 0.005 to 0.010 lb/ft², but are still well below the typical industry acceptable value of 0.050 lb/ft².

In the oil and gas industry, according to a preferred embodiment of the present invention, the inhibited hydrofluoric acid aqueous composition, said composition comprising:
   hydrofluoric acid in solution; and
   an alkanolamine; and
can be mixed with an acid to promote activation, this can be done in-situ or closed-loop, eliminating the risk of human or environmental exposure; minimizing or eliminating the risk of exposure to the activated material; and greatly improving safety and handling of the material compared to the current systems utilized in industry, which have proven fatal in the past to workers. Preferably, the addition of the inhibited hydrofluoric acid aqueous composition is done directly into the wellbore or closed-looped system in the case of non-oil & gas industrial applications and, more preferably, said composition is essentially aspirated into the system through a venturi effect by the acid composition being injected whose purpose is to activate the inhibited hydrofluoric acid aqueous composition.

Precipitation of Aluminum Containing Solids Using the Composition of Example #1

Aluminum is pervasive in clay and other soils and its dissolution and reprecipitation are problematic in the oil and gas industry as it tends to clog pores; thus, preventing optimal hydrocarbon extraction in aluminum rich formations.

To determine the ability of a composition according to a preferred embodiment of the present invention to prevent the precipitation of aluminum upon pH increase, titration of the composition of Example #1 was completed with NaOH, in the presence of: 1) a modified acid with lysine and HCl; 2) a modified acid with MEA and HCl; or 3) 15% HCl. The control was a solution of ammonium bifluoride (ABF or $NH_4HF_2$). The goal was to establish the ability of various compositions to prevent aluminum reprecipitation as pH increases. HF-containing solutions with dissolved aluminum were titrated with sodium hydroxide until precipitation was observed, according to the procedure reported by Shuchart and Gdanski in European Patent Application 0,654,582 A1 (Nov. 15, 1994).

Testing Procedure:

The titrand was a mixture of 10 mL of 1.16 mol/L $Al^{3+}$ and 10 mL of 1.16 mol/L $F^-$, resulting in a 0.58 mol/L solution with a ratio of 1:1/Al:F. The sources of fluoride used were:
   1) $NH_4HF_2$;
   2) the composition of Example #1 activated with 2.4 volume equivalents of a modified acid with lysine and HCl, giving full activation of $F^-$, with no excess hydrochloric acid;
   3) the composition of Example #1 activated with 2.8 volume equivalents of modified acid with monoethanolamine (MEA) and HCl, giving full activation of $F^-$, with no excess hydrochloric acid;
   4) the composition of Example #1 activated with 2.7 volume equivalents of 15% HCl, giving activation of with no excess hydrochloric acid.

Each solution was pre-heated to 90° C. and then titrated with 1 mol/L sodium hydroxide until precipitation was observed. The amount of sodium hydroxide used, and the pH of the final solution, were recorded. The results of both titration sets are provided in Table 2.

TABLE 2

Results of the titration of various HF solutions with sodium hydroxide

| | Trial | OH:Al | OH:Al | pH | pH |
|---|---|---|---|---|---|
| ABF | 1 | 0.32 | 0.32 ± 0.03 | 3.25 | 3.29 ± 0.04 |
| | 2 | 0.34 | | 3.32 | |
| | 3 | 0.28 | | 3.21 | |
| Modified acid with lysine and HCl | 1 | 1.67 | 1.71 ± 0.04 | 3.75 | 3.77 ± 0.08 |
| | 2 | 1.74 | | 3.70 | |
| | 3 | 1.73 | | 3.86 | |
| Modified acid with MEA and HCl | 1 | 1.60 | 1.63 ± 0.04 | 3.72 | 3.71 ± 0.03 |
| | 2 | 1.67 | | 3.74 | |
| | 3 | 1.64 | | 3.68 | |
| 15% HCl | 1 | 1.52 | 1.50 ± 0.02 | 3.14 | 3.24 ± 0.10 |
| | 2 | 1.49 | | 3.34 | |
| | 3 | 1.48 | | 3.25 | |

The results show that the composition of Example #1 is superior at preventing aluminum precipitation than ABF.

Using ammonium bifluoride (ABF), aluminum precipitation was observed at 0.32±0.03 OH ions per aluminum (pH 3.29), which is similar to the result reported by Shuchart and Gdanski of 0.33 OH ions per aluminum (pH 2.26).

Using a modified acid with lysine and HCl: the composition of Example #1, aluminum precipitation was observed at 1.71±0.04 OH ions per aluminum (pH 3.77);

Using a modified acid with MEA and HCl: the composition of Example #1, aluminum precipitation was observed at 1.63±0.04 OH ions per aluminum (pH 3.71).

Testing performed on 15% HCl: the composition of Example #1 yielded precipitation at 1.50±0.02 OH ions per aluminum (pH 3.24). In all cases the composition of Example #1 is approximately five times more effective at preventing aluminum precipitation when compared to ABF.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

What is claimed is:

1. A method of using a mud acid to acidize a sandstone formation, said method comprising the steps of:
    providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1:1;
    providing an acid composition, said acid composition having a low pH and adapted to activate the inhibited hydrofluoric acid composition when put in contact therewith;
    combining the inhibited hydrofluoric acid composition with said acid composition to create a mud acid;
    applying said mud acid to a silicate-containing formation and allowing said mud acid composition sufficient exposure time to dissolve a pre-determined amount of silica.

2. The method of claim 1, wherein combining the inhibited hydrofluoric acid composition with said acid composition to create the mud acid is performed by injecting the inhibited hydrofluoric acid directly into the acid composition while the acid composition is flowing.

3. The method of claim 1, wherein combining the inhibited hydrofluoric acid composition with said acid composition to create the mud acid is performed by injecting the inhibited hydrofluoric acid directly into the acid composition, while the acid composition is flowing, by a venturi entrainment of the inhibited hydrofluoric acid by the acid composition.

4. The method of claim 1, wherein said alkanolamine and hydrofluoric acid are present in a molar ratio of at least 1.1:1.

5. The method of claim 1, wherein the acid composition comprises an acid selected from the group consisting of HCl; MEA-HCl; urea-HCl; methanesulfonic acid; sulfuric acid; sulfamic acid; and lysine-HCl.

6. The method of claim 1, wherein the acid composition comprises an acid selected from the group consisting of MEA-HCl; urea-HCl; and lysine-HCl.

7. The method of claim 1, wherein the alkanolamine is selected from the group consisting of: monoethanolamine; diethanolamine; triethanolamine and combinations thereof.

8. A method for removing silica or silicate deposits, said method comprising the steps of:
    providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1:1;
    providing an acid composition, said acid composition having a low pH and adapted to activate the inhibited hydrofluoric acid composition when put in contact therewith;
    combining the inhibited hydrofluoric acid composition with the acid composition by injecting the inhibited hydrofluoric acid directly into the acid composition while the acid composition is flowing to create a mud acid; and
    applying the mud acid to a silica or silicate deposit.

9. The method of claim 8, wherein the inhibited hydrofluoric acid composition is injected directly into the flowing acid composition by a venturi entrainment of the inhibited hydrofluoric acid by the acid composition.

10. The method of claim 9, wherein said alkanolamine and hydrofluoric acid are present in a molar ratio of at least 1.1:1.

11. The method of claim 8, wherein said alkanolamine and hydrofluoric acid are present in a molar ratio of at least 1.1:1.

12. The method of claim 8, wherein the acid composition comprises an acid selected from the group consisting of HCl; MEA-HCl; urea-HCl; methanesulfonic acid; sulfuric acid; sulfamic acid; and lysine-HCl.

13. The method of claim 8, wherein the alkanolamine is selected from the group consisting of: monoethanolamine; diethanolamine; triethanolamine and combinations thereof.

14. A method for removing silica or silicate deposits on a metal surface, said method comprising the steps of:
    providing an inhibited hydrofluoric acid composition, comprising a pre-determined amount of hydrofluoric acid; and a pre-determined amount of an alkanolamine; wherein the molar ratio of alkanolamine:hydrofluoric acid is at least 1:1;
    providing an acid composition, said acid composition comprising a corrosion inhibitor package and having a low pH and adapted to activate the inhibited hydrofluoric acid composition when put in contact therewith;
    combining the inhibited hydrofluoric acid composition with the acid composition by injecting the inhibited hydrofluoric acid directly into the acid composition while the acid composition is flowing to create a mud acid; and
    applying the mud acid to a silica or silicate deposit of a metal surface.

15. The method according to claim 14, wherein said alkanolamine and hydrofluoric acid are present in a molar ratio of at least 1.1:1.

16. The method according to claim 14, wherein the corrosion inhibitor package comprises:
    a metal iodide;
    a terpene;
    optionally, a cinnamaldehyde or a derivative thereof;
    at least one amphoteric surfactant;
    a solvent; and
    optionally, a non-emulsifier.

17. The method according to claim 14, wherein the inhibited hydrofluoric acid composition is injected directly into the flowing acid composition by a venturi entrainment of the inhibited hydrofluoric acid by the acid composition.

18. The method of claim 1, wherein the acid composition comprises an acid having a pKa value of less than 3.

* * * * *